United States Patent Office 3,064,005
Patented Nov. 13, 1962

3,064,005
1-HALOETHYL, 5-AMINO-PYRAZOLE CARBONITRILES-(4)
Jean Druey, Riehen, and Paul Schmidt, Therwil, Switzerland, assignors to Ciba Corporation, a corporation of Delaware
No Drawing. Filed Nov. 25, 1959, Ser. No. 855,274
Claims priority, application Switzerland Dec. 5, 1958
2 Claims. (Cl. 260—310)

This invention provides new pyrazoles and a process for their manufacture.

The new compounds are amino-pyrazoles of the formula

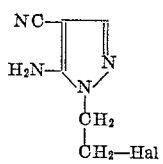

In this formula Hal indicates a halogen atom, primarily chlorine.

The new compounds are distinguished by a calming effect and are intended for use as medicaments, especially as tranquilizers. They are in addition valuable intermediate products for the manufacture of other medicaments, especially such of the pyrazolo[3:4-d]pyrimidine series or the pyrazolo-[3:4-d]-triazine series.

Especially valuable tranquilizing effects are exhibited by 2-(β-chloroethyl)-3-amino-4-cyano-pyrazole of the formula

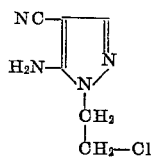

The new compounds are prepared by methods known per se.

One embodiment of the process of the invention consists in that in 2-(β-R-ethyl)-3-amino-4-cyanopyrazole in which R represents a radical replaceable by a halogen atom, this radical is so replaced. Thus preferably 2-(β-hydroxyethyl)-3-amino-4-cyano-pyrazol is used as starting material and treated with halogenating agents, advantageously with acid halides of sulfur or phosphorus, primarily thionyl chloride, phosphorus oxychloride or phosphorus pentachloride.

Another embodiment of the process of the invention consists in that in 2-(β-halogen-ethyl)-3-amino-4-R'-pyrazol in which R' represents a substituent replaceable by the cyano group, this substituent is replaced by the cyano group. As such a substituent is primarily concerned the carboxylic acid amide group, which can be converted by treatment with agents splitting off water, such as phosphorus pentoxide into the cyano group.

The above two embodiments can also be combined. Thus 2-(β-hydroxy-ethyl)-3-amino-4-carbamyl-pyrazole can be used as starting material and in one operation, for example with phosphorus pentachloride, both the nitrile group formed and the halogen atom introduced.

The starting materials are known or can be prepared by methods known per se. They can also be formed under the reaction conditions.

The invention also comprises any modification of the process in which a compound obtainable as an intermediate at any stage of the complete process is used as starting material and the remaining step or steps are carried out or in which the process is interrupted at any stage.

The new compounds of the invention can be used in the form of pharmaceutical preparations. These contain the said compounds in admixture with a pharmaceutical organic or inorganic excipient suitable for enteral or parenteral administration. As such are concerned substances that do not react with the described compounds, for example water, gelatine, lactose, starch, magnesium stearate, talc, vegetable oils, benzyl alcohols, gums, polyalkylene glycols, cholesterol or other known excipients. The pharmaceutical preparations can, for example take the form of tablets or dragees or can be prepared in fluid form as solutions, suspensions or emulsions. If desired they are sterilized and/or contain auxiliary substances such as preserving, stabilizing, wetting or emulsifying agents. They can also contain other therapeutically valuable substances. The preparations are produced by customary methods.

The following example illustrates the invention:

Example

A solution of 15.2 grams of 2-(β-hydroxyethyl)-3-amino-4-cyano-pyrazole in 150 cc. of thionyl chloride is heated for two hours to 50–60° C. The thionyl chloride is evaporated off under vacuum, the residue treated with ice water and a pH 8 established with N-sodium hydroxide solution. The deposited precipitate is then filtered with suction and recrystallized from ethanol. 2-(β-chlorethyl)-3-amino-4-cyano-pyrazole of the formula

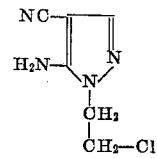

is thus obtained in yellow crystals of M.P. 154–155° C.

The 2-(β-hydroxyethyl)-3-amino-4-cyano-pyrazole used as starting material is prepared in the following manner:

A solution of 48.8 grams of ethoxymethylene-malonitrile in 500 cc. of ethanol is treated with 44 grams of 70% (β-hydroxyethyl)-hydrazine. The reaction mixture is then heated for 10 hours under reflux, evaporated under vacuum to dryness and crystallized from a little ethanol. 2-(β-hydroxyethyl)-3-amino-4-cyano-pyrazole of the formula

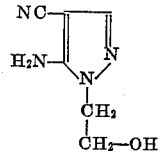

is thus obtained in yellow crystals of M.P. 156–158° C.

What is claimed is:
1. Amino-pyrazoles of the formula

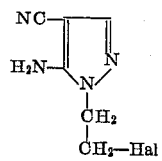

wherein Hal represents a halogen atom.
2. 2-(β-chloro-ethyl)-3-amino-4-cyano-pyrazole.

No references cited.